3,004,938
METHOD OF MAKING A SYNTHETIC RUBBER LATEX EMPLOYING ETHYL HYDROXYETHYL-CELLULOSE
Victor S. Chambers, Naugatuck, and Louis H. Howland, Watertown, Conn., assignors to United States Rubber Company, New York, N.Y., a corporation of New Jersey
No Drawing. Filed May 4, 1959, Ser. No. 810,597
14 Claims. (Cl. 260—17)

This invention relates to the preparation of synthetic rubber latices of large particle size, particularly to permit them to be concentrated to fluid latices of high solids content.

We have found that treating a synthetic rubber latex containing unreacted polymerizable monomeric material with a small amount of ethyl hydroxyethyl cellulose before removing unreacted monomers, results in a latex having a greatly increased particle size over the same latex without the ethyl hydroxyethyl cellulose treatment. Such latices that have been treated with ethyl hydroxyethyl cellulose in the presence of unreacted monomers may readily be concentrated, preferably by evaporation concentration, to fluid high solids latices.

In carrying out the present invention, the emulsion of synthetic rubber forming monomers is polymerized to a latex of a conversion of 60% to 95%, and the latex is treated with 0.05% to 1%, and preferably 0.1% to 0.6% of ethyl hydroxyethyl cellulose, based on the original weight of rubber forming monomers, at a temperature of 0° C. to 15° C. in the presence of at least 5% of unreacted polymerizable monomers based on the weight of the original synthetic rubber forming monomers. The time of treatment is not critical. The ethyl hydroxyethyl cellulose may be added to the latex with or after the shortstopping agent after the desired conversion of 60% to 95%, and the residual monomers may then be removed. If the ethyl hydroxyethyl cellulose is added to the initial emulsion of monomers, it may be in contact with the latex for a time to carry out the polymerization generally not more than 24 hours. The ethyl hydroxyethyl cellulose may be added at any intermediate stage of the polymerization. The invention is particularly useful in low temperature polymerizations between 0° C. and 15° C., since it is difficult to cool a high temperature polymerization batch for treatment with ethyl hydroxyethyl cellulose before stripping unreacted monomers. There must be at least 5% of unreacted polymerizable monomers, based on the weight of original synthetic rubber forming monomers, present in the latex at the time of treatment with the ethyl hydroxyethyl cellulose otherwise increase in particle size will not result. The unreacted monomers present with the ethyl hydroxyethyl cellulose may be all the unreacted monomers after the desired conversion or only part of them as where volatile monomers, such as butadiene-1,3 are vented from the latex before addition of the ethyl hydroxyethyl cellulose, provided at least 5% of higher boiling monomers, such as styrene, remain for the ethyl hydroxyethyl cellulose treatment, after which such higher boiling monomers may be stripped from the latex as by steam distillation. The latex will conventionally have a solids content of 20% to 50% and may be concentrated to a solids content of 55% to 70%, giving a fluid high solids latex. The latex may be concentrated by increasing the solids content in known manner as by creaming with a vegetable mucilage, such as ammonium alginate. It is preferred however, to increase the solids content by evaporation concentration. Unreacted monomers may be stripped from the latex by the evaporation concentration.

Ethyl hydroxyethyl cellulose is made by treating alkali cellulose with a mixture of ethylene oxide and ethyl chloride to give the mixed ether as described in the abstract of the paper "Sol-gel transformations of water-soluble ethylated hydroxyethyl-cellulose" by Sonnerskog in Chem. Abstracts 40, 458 (1946). Ethyl hydroxyethyl celluloses are generally graded by the viscosity in centipoises of a 2% aqueous solution of the ethyl hydroxyethyl cellulose in water at 20° C. Ethyl hydroxyethyl celluloses having a viscosity in 2% aqueous solution at 20° C. from 15 to 600 centipoises may be used in the present invention. However, the higher viscosity ethyl hydroxyethyl celluloses, e.g. having a viscosity in 2% aqueous solution at 20° C. of 600 centipoises, are not as effective as the preferred ethyl hydroxyethyl celluloses of lower viscosities in 2% aqueous solution at 20° C. of 15 to 150 centipoises.

The synthetic rubber latex may be an aqueous emulsion polymerizate of one or more butadienes-1,3, for example, butadiene-1,3,2-methylbutadiene-1,3 (isoprene), 2,3-dimethyl-butadiene-1,3, piperylene, or a mixture of one or more such butadienes-1,3, with one or more other polymerizable compounds which are capable of forming rubbery copolymers with butadienes-1,3, for example, up to 70% by weight of such mixture of one or more monoethylenic compounds which contain a $CH_2=C<$ group where at least one of the disconnected valences is attached to an electro-negative group, that is, a group which substantially increases the electrical dissymmetry or polar character of the molecule. Examples of compounds which contain a $CH_2=C<$ group and are copolymerizable with butadienes-1,3 are aryl olefines, such as styrene, vinyl toluene, alpha methyl styrene, chlorostyrene, dichlorostyrene, vinyl naphthalene; the alpha methylene carboxylic acids and their esters, nitriles and amides, such as acrylic acid, methyl acrylate, methyl methacrylate, acrylonitrile, methacrylonitrile, methacrylamide; vinyl pyridines, such as 2-vinyl pyridine, 2-methyl-5-vinyl pyridine; methyl vinyl ketone; vinylidene chloride. Such a synthetic rubber latex may be termed a "butadiene polymer synthetic rubber latex." The latices will contain dispersing agents from the polymerization generally in amount from 2% to 10% by weight of the solids of the latex of one or a mixture of anionic surface-active dispersing agents. Such anionic surface-active dispersing agents may be water-soluble soaps of soap-forming monocarboxylic acids, such as alkali-metal, ammonium or amine salts of higher fatty acids having 10 to 24 carbon atoms in the molecule or of rosin acids, including hydrogenated, dehydrogenated and disproportionated rosin acids. The anionic surface-active dispersing agents may be sulfonated or sulfated compounds having the general formula $R-SO_3M$ or $R-OSO_3M$, where M represents alkali-metal, ammonium or amine radical, and R represents an organic radical containing a group having 9 to 23 carbon atoms, such as alkyl sulfonates, e.g. dodecyl sodium sulfonate; alkyl sulfates, e.g. sodium oleyl sulfate; alkyl aryl sulfonates, e.g. dodecyl benzene sulfonate; alkyl sulfosuccinates, e.g. dioctyl sodium sulfosuccinate; aryl sulfonate-formaldehyde condensation products, e.g. condensation product of sodium naphthalene sulfonate and formaldehyde.

The following examples illustrate the invention. All parts and percentages referred to herein are by weight.

*Example 1*

In run A, a 24-ounce glass bottle reactor was loaded with the following ingredients: 70 parts of butadiene-1,3; 30 parts of styrene; 0.2 part of sodium formaldehyde sulfoxylate; 0.15 part of di-isopropylbenzene hydroperoxide; 0.015 part of ferrous sulfate heptahydrate; 0.03 part of the tetrasodium salt of ethylene diamine tetraacetic acid; 4.0 parts of potassium oleate; 1 part of a condensation product of sodium naphthalene sulfonate and formaldehyde dispersing agent; 0.5 part of potassium sulfate; 0.03 part of sodium dithionite, 0.1 part of tertiary dodecyl mercaptan; and 100 parts of water. The mixture was agitated by end over end rotation at 5° C. The conversion of the monomers into polymer in this and the other examples was followed by periodically measuring the percent solids of the polymerizing system. When the conversion had reached approximately 42%, a solution of 0.5 part of a condensation product of sodium naphthalene sulfonate and formaldehyde dispersing agent and 50 parts of water was added. The polymerization was allowed to proceed for a total of 6.5 hours until 89% conversion was reached when it was shortstopped with 0.2 part of potassium dimethyldithiocarbamate dissolved in 4 parts of water. Unreacted butadiene was vented off. The average particle diameter of the latex was 870 Angstrom units.

Run B was similar to run A except that at approximately 49% conversion there were added 0.5 part of an ethyl hydroxyethyl cellulose whose 2% aqueous solution has a viscosity of about 20 centipoises at 20° C., 0.5 part of a condensation product of sodium naphthalene sulfonate and formaldehyde dispersing agent, and 50 parts of water. The polymerization was shortstopped after a total of 6.5 hours at 90% conversion. After venting off unreacted butadiene, the average particle diameter of the latex was 1520 Angstrom units.

Run C was similar to Run A except that at approximately 40% conversion there was added 0.5 part of an ethyl hydroxyethyl cellulose whose 2% aqueous solution has a viscosity of about 100 centipoises at 20° C., 0.5 part of a condensation product of sodium naphthalene sulfonate and formaldehyde dispersing agent, and 50 parts of water. The polymerization was shortstopped after a total of 6.5 hours at 77% conversion. After venting off unreacted butadiene, the average particle diameter of the latex was 1760 Angstrom units.

Example 2

The following polymerization recipe was used in this example: 70 parts of butadiene-1,3; 30 parts of styrene; 0.2 part of sodium formaldehyde sulfoxylate, 0.15 part of di-isopropylbenzene hydroperoxide; 0.015 part of ferrous sulfate heptahydrate; 0.03 part of the tetrasodium salt of ethylene diamine tetraacetic acid; 3.0 parts of potassium oleate; 0.5 part of a condensation product of sodium naphthalene sulfonate and formaldehyde dispersing agent; 0.75 part of potassium sulfate; 0.03 part of sodium dithionite; 0.1 part of tertiary dodecyl mercaptan; and 130 parts of water. The polymerization temperature was 5° C.

In run D, when the conversion reached approximately 44%, there was added 0.1 part of an ethyl hydroxyethyl cellulose whose 2% aqueous solution has a viscosity of about 20 centipoises at 20° C., 0.2 part of a condensation product of sodium naphthalene sulfonate and formaldehyde dispersing agent, and 20 parts of water. The polymerization was stopped at 85% conversion as in Example 1. After venting off unreacted butadiene, the average particle diameter of the latex was 1300 Angstrom units.

In run E, when the conversion reached approximately 43%, there was added 0.1 part of an ethyl hydroxyethyl cellulose whose 2% solution in water has a viscosity of about 100 centipoises at 20° C., 0.2 part of a condensation product of sodium naphthalene sulfonate and formaldehyde dispersing agent, and 20 parts of water. The polymerization was stopped at 76% conversion as in Example 1. After venting off unreacted butadiene, the average particle diameter of the latex was 1360 Angstrom units.

In run F, when the conversion reached approximately 31%, there was added 0.5 part of an ethyl hydroxyethyl cellulose whose 2% solution in water has a viscosity of about 600 centipoises at 20° C., and 20 parts of water. The polymerization was shortstopped at 63% conversion as in Example 1. After venting off unreacted butadiene, the average particle size of the latex was 1090 Angstrom units.

The average particle size of the latex prepared as in runs D, E, and F, without the addition of the ethyl hydroxyethyl cellulose is from 500 to 600 Angstrom units.

Example 3

The following polymerization recipe was used in this example: 70 parts of butadiene-1,3; 30 parts of styrene; 0.2 part of sodium formaldehyde sulfoxylate; 0.15 part of di-isopropylbenzene hydroperoxide; 0.015 part of ferrous sulfate heptahydrate; 0.03 part of the tetrasodium salt of ethylene diamine tetraacetic acid; 4.0 parts of potassium oleate; 1 part of a condensation product of sodium naphthalene sulfonate and formaldehyde dispersing agent; 0.5 part of potassium sulfate; 0.1 part of tertiary dodecyl mercaptan; and 130 parts of water. The polymerization temperature was 5° C.

In run G, when the conversion reached approximately 58% there was added 0.5 part of a condensation product of sodium naphthalene sulfonate and formaldehyde dispersing agent, and 30 parts of water. The polymerization was shortstopped at 95% conversion by adding 0.2 part of potassium dithiocarbamate dissolved in 4 parts of water. After venting off unreacted butadiene, the latex had an average particle diameter of 600 Angstrom units. Run G' was a duplicate of run G, except the 0.5 part of the condensation product was added at 52% conversion, and the polymerization was shortstopped at 89% conversion. The average particle diameter of the latex was 580 Angstrom units. The latices from runs G and G' were mixed and steam distilled to strip off the residual monomeric styrene, and then concentrated by evaporation concentration in a laboratory disc concentrator at 45° C. to 50° C. to a solids content of 49%. The latex of 49% solids content has a viscosity of 2060 centipoises measured at approximately 25° C.

In duplicate runs H, when the conversions reached approximately 59%, there was added 0.5 part of an ethyl hydroxyethyl cellulose whose 2% solution in water has a viscosity of about 20 centipoises at 20° C., 0.5 part of a condensation product of sodium naphthalene sulfonate and formaldehyde dispersing agent, and 30 parts of water. The polymerizations were shortstopped at 92% conversion as in run G. After venting off unreacted butadiene, the latices had an average particle diameter of 1600 Angstrom units and 1640 Angstrom units, respectively. The latices from the duplicate runs were mixed, and steam distilled to strip unreacted styrene, and concentrated by evaporation concentration in a laboratory disc concentrator at 45° C. to 50° C. to 60% solids content. The latex of 60% solids content had a viscosity of 680 centipoises measured at approximately 25° C.

In duplicate runs J, when the conversions reached 86%, 0.5 part of an ethyl hydroxyethyl cellulose whose 2% solution in water has a viscosity of about 20 centipoises at 20° C., 0.5 part of a condensation product of sodium naphthalene sulfonate and formaldehyde dispersing agent, and 30 parts of water were added together with 0.2 part of potassium dithiocarbamate shortstop dissolved in 4 parts of water. After venting off unreacted butadiene, the latices had an average particle diameter of 1470 Angstrom units and 1520 Angstrom units respectively. The latices from the duplicate runs were mixed, and steam distilled to strip unreacted styrene, and concentrated by evaporation concentration in a laboratory disc concentrator at 45° C. to 50° C. to 57% solids content. The latex of 57% solids content had a viscosity of 640 centipoises measured at approximately 25° C.

The latices of increased particle size according to the present invention, particularly of high solids content, may be used in the usual application of latices, as in foam sponge manufacture, tire cord dipping, bonding and impregnating various materials, preparation of adhesives, and the like.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. The method of making a synthetic rubber latex which comprises subjecting to polymerizing conditions an aqueous emulsion of synthetic rubber forming monomers selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 until a latex of 60% to 95% conversion is produced, and incorporating in the latex in the presence of at least 5% of unreacted polymerizable monomeric material based on the weight of the original synthetic rubber forming monomers 0.05 to 1 part of ethyl hydroxyethyl cellulose per 100 parts by weight of original synthetic rubber forming monomers at a temperature from 0° C. to 15° C., and then removing unreacted monomeric material from the latex, said ethyl hydroxyethyl cellulose having a viscosity in 2% aqueous solution at 20° C. of 15 to 600 centipoises.

2. The method of making of synthetic rubber latex which comprises subjecting to polymerizing conditions an aqueous emulsion of synthetic rubber forming monomers selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 until a latex of 60% to 95% conversion is produced, and incorporating in the latex in the presence of at least 5% of unreacted polymerizable monomeric material based on the weight of the original synthetic rubber forming monomers 0.1 to 0.6 part of ethyl hydroxyethyl cellulose per 100 parts by weight of original synthetic rubber forming monomers at a temperature from 0° C. to 15° C., and then removing unreacted monomeric from the latex, said ethyl hydroxyethyl cellulose having a viscosity in 2% aqueous solution at 20° C. of 15 to 150 centipoises.

3. The method of making a synthetic rubber latex which comprises subjecting to polymerizing conditions at 0° C. to 15° C. an aqueous emulsion of synthetic rubber forming monomers selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 until a latex of 60% to 95% conversion is produced, and incorporating in the latex in the presence of at least 5% of unreacted polymerizable monomeric material based on the weight of the original synthetic rubber forming monomers 0.05 to 1 part of ethyl hydroxyethyl cellulose per 100 parts by weight of original synthetic rubber forming monomers at a temperature from 0° C. to 15° C., and then removing unreacted monomeric material from the latex, said ethyl hydroxyethyl cellulose having a viscosity in 2% aqueous solution at 20° C. of 15 to 150 centipoises.

4. The method of making a synthetic rubber latex which comprises subjecting to polymerizing conditions at 0° C. to 15° C. an aqueous emulsion of synthetic rubber forming monomers selected from the group consisting of butadienes-1,3 and mixtures of butadienes-1,3 with up to 70% by weight of such mixtures of monoethylenic compounds which contain a $CH_2=C<$ group and are copolymerizable with butadienes-1,3 until a latex of 60% to 95% conversion is produced, and incorporating in the latex in the presence of at least 5% of unreacted polymerizable monomeric material based on the weight of the original synthetic rubber forming monomers 0.1 to 0.6 part of ethyl hydroxethyl cellulose per 100 parts by weight of original synthetic rubber forming monomers at a temperature from 0° C. to 15° C., and then removing unreacted monomeric material from the latex, said ethyl hydroxyethyl cellulose having a viscosity in 2% aqueous solution at 20° C. of 15 to 600 centipoises.

5. The method of making a synthetic rubber latex which comprises subjecting to polymerizing conditions an aqueous emulsion of butadiene-1,3 and styrene until a latex of 60% to 95% conversion is produced, and incorporating in the latex in the presence of at least 5% of unreacted polymerizable monomeric material based on the weight of the original synthetic rubber forming monomers 0.05 to 1 part of ethyl hydroxyethyl cellulose per 100 parts by weight of original synthetic rubber forming monomers at a temperature from 0° C. to 15° C., and then removing unreacted monomeric material from the latex, said ethyl hydroxyethyl cellulose having a viscosity in 2% aqueous solution at 20° C. of 15 to 600 centipoises.

6. The method of making a synthetic rubber latex which comprises subjecting to polymerizing conditions at 0° C. to 15° C. an aqueous emulsion of butadiene-1,3 and styrene until a latex of 60% to 95% conversion is produced, and incorporating in the latex in the presence of at least 5% of unreacted polymerizable monomeric material based on the weight of the original synthetic rubber forming monomers 0.05 to 1 part of ethyl hydroxyethyl cellulose per 100 parts by weight of original synthetic rubber forming monomers at a temperature from 0° C. to 15° C., and then removing unreacted monomeric material from the latex, said ethyl hydroxyethyl cellulose having a viscosity in 2% aqueous solution at 20° C. of 15 to 150 centipoises.

7. The method of making a concentrated synthetic rubber latex which comprises subjecting to polymerizing conditions an aqueous emulsion of synthetic rubber forming monomers selected from the group consisting of butadienes-1,3 and mixtures of butadienes-1,3 with up to 70% of such mixtures of monoethylenic compounds which contain a $CH_2=C<$ group and are copolymerizable with butadienes-1,3 until a latex of 60% to 95% conversion and a solids content of 20% to 50% is produced, and incorporating in the latex in the presence of at least 5% of unreacted polymerizable monomeric material based on the weight of the original synthetic rubber forming monomers 0.05 to 1 part of ethyl hydroxyethyl cellulose per 100 parts by weight of original synthetic rubber forming monomers at a temperature from 0° C. to 15° C., and then removing unreacted monomeric material from the latex and concentrating the latex to a solids content of 55% to 70%, said ethyl hydroxyethyl cellulose having a viscosity in 2% aqueous solution at 20° C. of 15 to 150 centipoises.

8. The method of making a concentrated synthetic rubber latex which comprises subjecting to polymerizing conditions an aqueous emulsion of synthetic rubber forming monomers selected from the group consisting of butadienes-1,3 and mixtures of butadienes-1,3 with up to 70% of such mixtures of monoethylenic compounds which contain a $CH_2=C<$ group and are copolymerizable with butadienes-1,3 until a latex of 60% to 95% conversion and a solids content of 20% to 50% is produced, and incorporating in the latex in the presence of at least 5% of unreacted polymerizable monomeric material based on the weight of the original synthetic rubber forming monomers 0.05 to 1 part of ethyl hydroxyethyl cellulose per 100 parts by weight of original synthetic rubber forming monomers at a temperature from 0° C. to 15° C., and then removing unreacted monomeric material from the latex and evaporating water from the latex until the latex is concentrated to a solids content of 55% to 70%, said ethyl hydroxyethyl cellulose having a viscosity in 2% aqueous solution at 20° C. of 15 to 600 centipoises.

9. The method of making a concentrated synthetic rubber latex which comprises subjecting to polymerizing conditions at 0° C. to 15° C. an aqueous emulsion of synthetic rubber forming monomers selected from the group consisting of butadienes-1,3 and mixtures of butadienes-1,3 with up to 70% of such mixtures of monoethylenic compounds which contain a $CH_2=C<$ group and are copolymerizable with butadienes-1,3 until a latex of 60% to 95% conversion and a solids content of 20% to 50% is produced, and incorporating in the latex in the presence of at least 5% of unreacted polymerizable monomeric material based on the weight of the original synthetic rubber forming monomers 0.05 to 1 part of ethyl hydroxyethyl cellulose per 100 parts by weight of original synthetic rubber forming monomers at a temperature from 0° C. to 15° C., and then removing unreacted monomeric material from the latex and concentrating the latex to a solids content of 55% to 70%, said ethyl hydroxyethyl cellulose having a viscosity in 2% aqueous solution at 20° C. of 15 to 600 centipoises.

10. The method of making a concentrated synthetic rubber latex which comprises subjecting to polymerizing conditions at 0° C. to 15° C. an aqueous emulsion of synthetic rubber forming monomers selected from the group consisting of butadienes-1,3 and mixtures of butadienes-1,3 with up to 70% of such mixtures of monoethylenic compounds which contain a $CH_2=C<$ group and are copolymerizable with butadienes-1,3 until a latex of 60% to 95% conversion and a solids content of 20% to 50% is produced, and incorporating in the latex in the presence of at least 5% of unreacted polymerizable monomeric material based on the weight of the original synthetic rubber forming monomers 0.1 to 0.6 part of ethyl hydroxyethyl cellulose per 100 parts by weight of original synthetic rubber forming monomers at a temperature from 0° C. to 15° C., and then removing unreacted monomeric material from the latex and evaporating water from the latex until the latex is concentrated to a solids content of 55% to 70%, said ethyl hydroxyethyl cellulose having a viscosity in 2% aqueous solution at 20° C. to 15 to 150 centipoises.

11. The method of making a concentrated synthetic rubber latex which comprises subjecting to polymerizing conditions an aqueous emulsion of butadiene-1,3 and styrene until a latex of 60% to 95% conversion and a solids content of 20% to 50% is produced, and incorporating in the latex in the presence of at least 5% of unreacted polymerizable monomeric material based on the weight of the original synthetic rubber forming monomers 0.05 to 1 part of ethyl hydroxyethyl cellulose per 100 parts by weight of original synthetic rubber forming monomers at a temperature from 0° C. to 15° C. and then removing unreacted monomeric material from the latex and concentrating the latex to a solids content of 55% to 70%, said ethyl hydroxyethyl cellulose having a viscosity in 2% aqueous solution at 20° C. of 15 to 150 centipoises.

12. The method of making a concentrated synthetic rubber latex which comprises subjecting to polymerizing conditions an aqueous emulsion of butadiene-1,3 and styrene until a latex of 60% to 95% conversion and a solids content of 20% to 50% is produced, and incorporating in the latex in the presence of at least 5% of unreacted polymerizable monomeric material based on the weight of the original synthetic rubber forming monomers 0.05 to 1 part of ethyl hydroxyethyl cellulose per 100 parts by weight of original synthetic rubber forming monomers at a temperature from 0° C. to 15° C., and then removing unreacted monomeric material from the latex and evaporating water from the latex until the latex is concentrated to a solids content of 55% to 70%, said ethyl hydroxyethyl cellulose having a viscosity in 2% aqueous solution at 20° C. of 15 to 600 centipoises.

13. The method of making a concentrated synthetic rubber latex which comprises subjecting to polymerizing conditions at 0° C. to 15° C. an aqueous emulsion of butadiene-1,3 and styrene until a latex of 60% to 95% conversion and a solids content of 20% to 50% is produced, and incorporating in the latex in the presence of at least 5% of unreacted polymerizable monomeric material based on the weight of the original synthetic rubber forming monomers 0.05 to 1 part of ethyl hydroxyethyl cellulose per 100 parts by weight of original synthetic rubber forming monomers at a temperature from 0° C. to 15° C., and then removing unreacted monomeric material from the latex and evaporating water from the latex until the latex is concentrated to a solids content of 55% to 70%, said ethyl hydroxyethyl cellulose having a viscosity in 2% aqueous solution at 20° C. of 15 to 600 centipoises.

14. The method of making a concentrated synthetic rubber latex which comprises subjecting to polymerizing conditions at 0° C. to 15° C. an aqueous emulsion of butadiene-1,3 and styrene until a latex of 60% to 95% conversion and a solids content of 20% to 50% is produced, and incorporating in the latex in the presence of at least 5% of unreacted polymerizable monomeric material based on the weight of the original synthetic rubber forming monomers 0.1 to 0.6 part of ethyl hydroxyethyl cellulose per 100 parts by weight of original synthetic rubber forming monomers at a temperature from 0° C. to 15° C., and then removing unreacted monomeric material from the latex and evaporating water from the latex until the latex is concentrated to a solids content of 55% to 70%, said ethyl hydroxyethyl cellulose having a viscosity in 2% aqueous solution at 20° C. of 15 to 150 centipoises.

References Cited in the file of this patent

UNITED STATES PATENTS

| | | |
|---|---|---|
| 2,615,009 | St. John | Oct. 21, 1952 |
| 2,758,103 | Henson et al. | Aug. 7, 1956 |
| 2,839,483 | Howland | June 17, 1958 |